Jan. 17, 1928.
L. C. COLE
1,656,345
OSCILLATING TOOL SUPPORT FOR LATHES
Filed Oct. 31, 1925
2 Sheets-Sheet 1

INVENTOR
L.C.Cole
BY
Joseph K. Schofield
ATTORNEY

Jan. 17, 1928.

L. C. COLE 1,656,345

OSCILLATING TOOL SUPPORT FOR LATHES

Filed Oct. 31, 1925   2 Sheets-Sheet 2

INVENTOR
L.C.Cole
BY
Joseph N. Schofield
ATTORNEY

Patented Jan. 17, 1928.

1,656,345

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

OSCILLATING TOOL SUPPORT FOR LATHES.

Application filed October 31, 1925. Serial No. 65,997.

This invention relates to tool supports for lathes and in particular to an auxiliary tool support adapted for turning outside journals in a journal turning lathe for locomotive and car wheels and axles.

An object of the present invention is to provide a tool support in a lathe adapted primarily for turning the outside journals of locomotive trailer axles and car axles, and to provide means for oscillating the support out of its operative position when the lathe is being used for locomotive driving wheels and axles or other work not requiring the auxiliary support.

The invention relates particularly to an improved form of tool support for a journal turning lathe such as shown in the patent to Teas et al. 1,370,715 granted March 8, 1921.

One feature which is important is that the tool support rests upon a base member attached adjustably to the bed plate of a locomotive driving wheel and trailer journal turning lathe, the base member being provided with fluid pressure operated means for quickly moving the tool support into or out of its operative position.

Another feature which is advantageous is that feeding means are provided for a tool slide on this auxiliary tool support from a main feed shaft, the feed connections comprising a telescoping shaft and bevel gear driving connections so that movement of the tool support into or out of operative position does not disconnect the feeding means for a tool slide on the oscillating support.

Another object of the invention is to mount a cylinder adjacent the tool support, preferably so that it may oscillate, and connect a piston within this cylinder to the oscillating tool support by means of a connecting rod. By means of compressed air, or other fluid, admitted to the cylinder on either side of the piston, the tool support may be swung to either its operative or inoperative position. Also separate clamping means are provided for the support to rigidly retain the tool support in its operative position.

With the above and other objects in view, my invention consists in the features of construction and operation set forth in the following specification and illustrated in the accompanying drawings.

In the accompanying drawings annexed hereto and forming a part of this specification, I have shown my invention embodied in a journal turning lathe for locomotive and car wheel axles, but it will be understood that the invention can be otherwise embodied and that the drawings are not to be construed as defining or limiting the scope of the invention, the claims appended to this specification being relied upon for that purpose.

Figure 1:
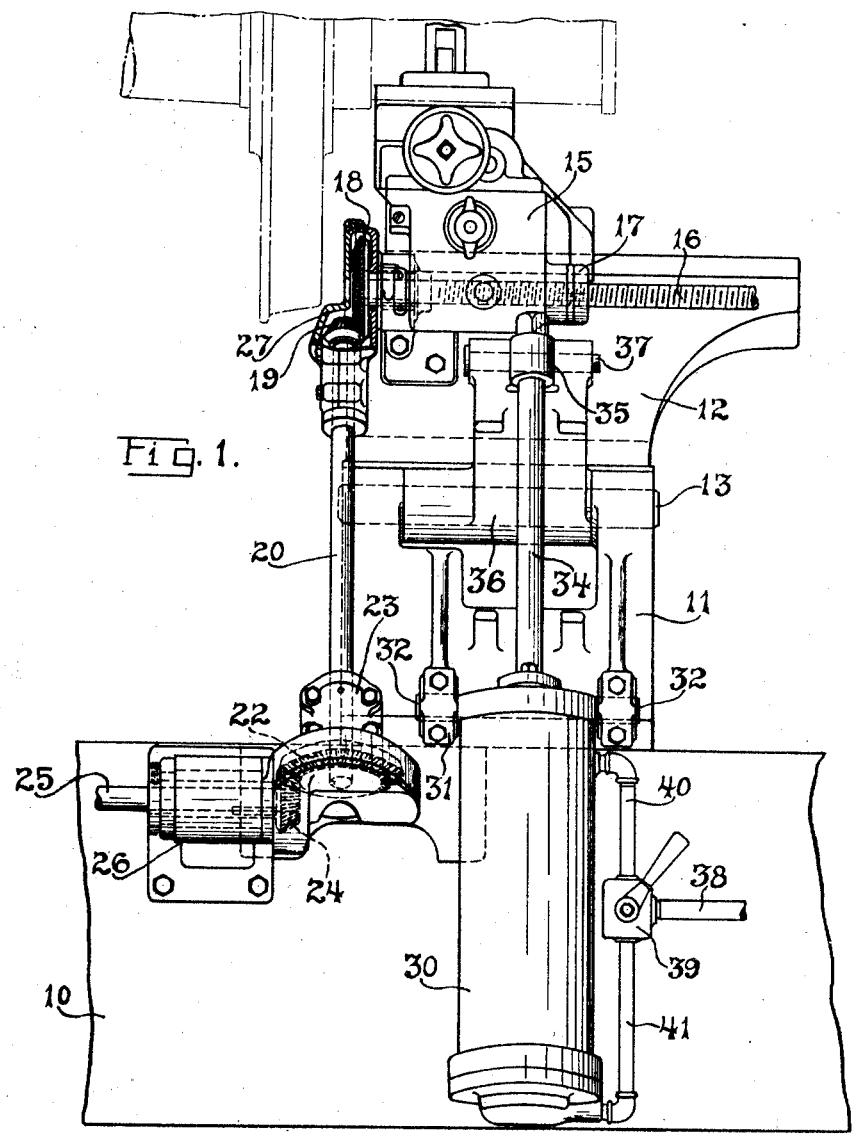
Figure 1 is a front elevation of the auxiliary tool support upon its base member, a part of the lathe bed also being shown.

In the above mentioned drawings I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: First, a base member, preferably attached directly to the bed of a lathe such as that shown in the above referred to patent; second, a tool support pivotally mounted upon said base by means of a pin extending longitudinally and horizontally of the tool support and lathe bed; third, a tool slide movably mounted upon this tool support; fourth, feeding means including gear connections from a main feed shaft extending along the front of the bed, a telescoping shaft driven therefrom and geared means at the opposite end of the telescoping shaft connected directly to a feed screw on the tool support; fifth, a cylinder pivotally mounted adjacent the base member; sixth, a piston and piston rod movable within the cylinder, the upper end of the piston rod being pivotally attached to the tool support; and sixth, fluid pressure means for actuating the piston and connecting rod within the cylinder to swing the tool support into or out of its operative position.

Referring more in detail to the figures of the drawing, a section of a lathe bed similar in every way to that shown in the above referred to patent is shown at 10. Upon this bed 10 is attached, preferably in a manner permitting longitudinal adjustment, a base member 11, on which rests a tool support 12. A pin 13 extending horizontally and longitudinally through the base member 11 and tool support 12 permits oscillating movements of the tool support 12 relative to the base member 11. As shown, this pin 13 engages aligned apertures in the base member 11 and the tool support 12. Also the pin 13 extends horizontally and parallelly to the direction of movement of the support 12. One or more screws 14 at the rear end of the tool support 12 and base member 11 provide means for securely clamping the tool support 12 in its operative position.

A tool slide 15 is longitudinally movable upon the upper horizontal surface of the tool support 12 and, in order to move this tool slide during operation, a feed screw 16 is provided rotatably mounted upon the tool support 12 which is adapted to engage a nut 17 in the tool slide 15. Rotation therefore of this screw 16 will move the tool slide 15 longitudinally. At one end of this screw 16 is a bevel gear 18 rigidly attached thereto which is in engagement with a bevel gear 19 on the upper end of a telescoping shaft 20. The telescoping shaft 20 is splined, as shown at 21, and passes through the hub portion of a bevel gear 22 rotatable within a suitable bearing 23. Bevel gear 22 is in engagement with a bevel gear 24 on one end of the main feed shaft 25 similar to that shown in the above referred to patent and which extends longitudinally along the front vertical surface of the bed 10. In order to permit swinging movements of the tool support 12 without disengaging these driving connections for the feed screw 16, the bearing 23 for supporting the bevel gear 22 at the lower end of the telescoping shaft 20 is housed rotatably within a bracket 26 fixed to the front wall of the lathe bed 10 so that it may swing about the axis of the main feed shaft 25. Similarly the bearing for the bevel gear 19 at the upper end of the telescoping shaft 20 is mounted rotatably within a member 27 and is adapted to oscillate about the axis of the feed screw 16 for the tool slide 15. In this way swinging movements of the tool support 12 into and out of operative position permit the telescoping shaft 20, which is splined throughout the major portion of its length, to pass within the bearing 23 and the hub portion of bevel gear 22. Also the bevel gear 19 at the upper end of the telescoping shaft is adapted to oscillate by means of its supporting member 27.

Figure 2:
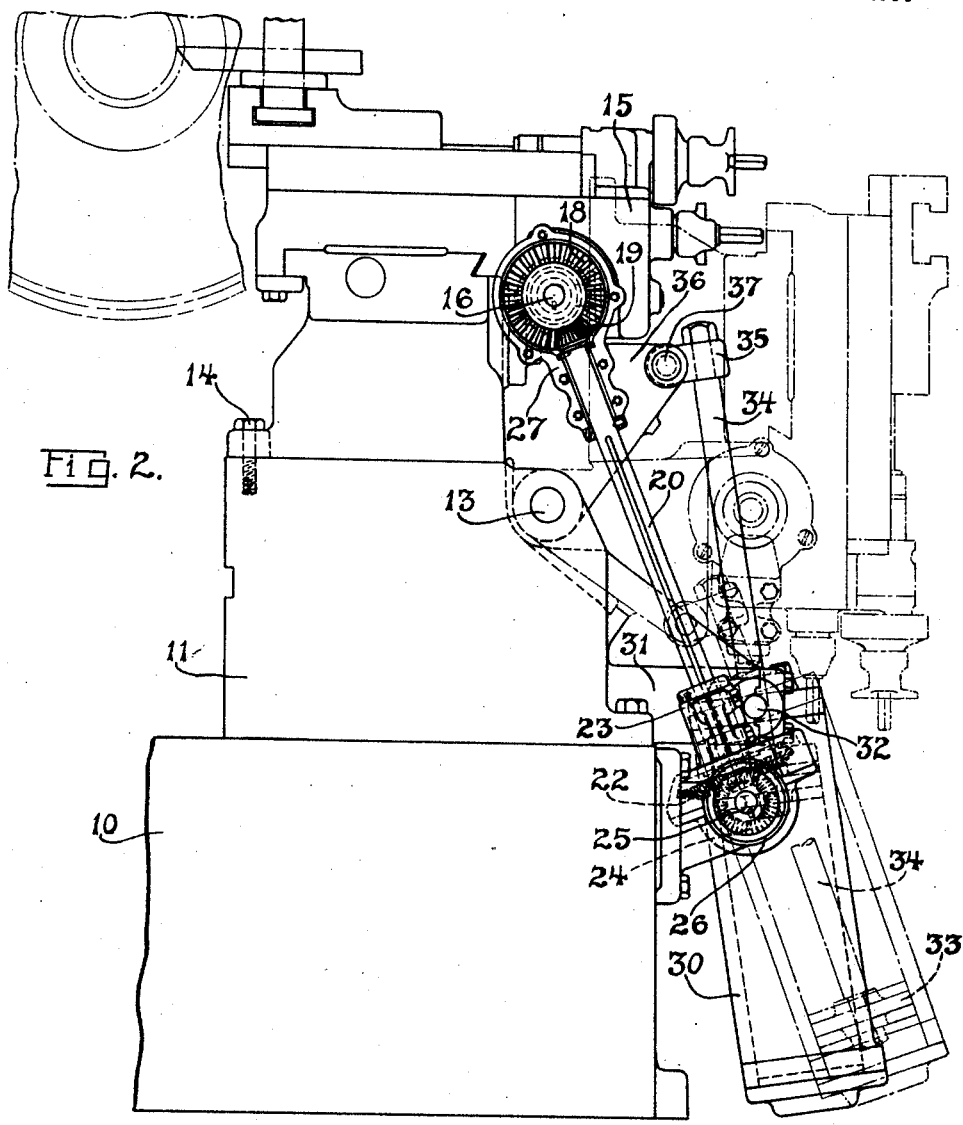
Fig. 2 is a side elevation of the parts shown in Fig. 1, the tool support being shown in full lines in operative position and in dotted lines in its inoperative position.

In order to quickly swing the tool support 12 into and out of its operative position, I mount a cylinder 30, preferably upon a support 31 outstanding from the base member 11. Preferably this cylinder 30 is attached to the bracket 31 by means of trunnions 32 so that the cylinder 30 may have a limited swinging movement. Within this cylinder 30 is a piston 33 connected directly to a piston rod 34 extending upwardly through the upper end of the cylinder. The upper end of this piston rod 34 is attached to an extension 35 thereon pivotally mounted relative to the tool support 12 so that movement of the piston 33 within the cylinder 30 will move the piston rod 34 upward or downward within the cylinder 30 and thus cause the tool support 12 to swing into or out of its operative position about its pivot 13. As shown in Fig. 2, the tool support 12 is provided with a forwardly extending projection 36 to which the member 35 is attached by means of a pin 37.

In order to control the position of the piston 33 within the cylinder 30, a fluid under pressure, preferably compressed air, is used which may be supplied through a pipe 38 shown in Fig. 1. By means of a valve 39, this fluid under pressure may be admitted through a pipe 40 to the upper end of the cylinder or through another pipe 41 to the lower end of the cylinder 30, passages being provided so that air may be exhausted from either end of the cylinder 30 through the valve 39.

What I claim is:

1. A tool support for lathes comprising in combination, a base member, a support pivotally attached thereto, a tool slide movably mounted on said support, feeding means for said slide, a telescoping shaft drivingly connected to said feeding means, fluid pressure means to oscillate said support into and out of operative position while said feeding means remains connected to its telescoping shaft, and means to clamp said support in operative position.

2. A tool support for lathes comprising in combination, a base member, a support pivotally attached thereto, a tool slide movably mounted on said support, feeding means for said slide including a feed shaft, a feed screw, a telescoping shaft and bevel gear connections, fluid pressure means to oscillate said support into and out of operative position while said feeding means remain operatively connected, and means to clamp said support in operative position.

In testimony whereof, I hereto affix my signature.

LYNDON C. COLE.